US012561930B2

(12) United States Patent \
Hewitt et al.

(10) Patent No.: US 12,561,930 B2 \
(45) Date of Patent: Feb. 24, 2026

(54) PARAMETRIC EYEBROW REPRESENTATION AND ENROLLMENT FROM IMAGE INPUT

(71) Applicant: Microsoft Technology Licensing, LLC, Redmond, WA (US)

(72) Inventors: Charles Thomas Hewitt, Cambridge (GB); James Clemoes, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 18/512,461

(22) Filed: Nov. 17, 2023

(65) Prior Publication Data

US 2025/0166324 A1    May 22, 2025

(51) Int. Cl.
| | |
|---|---|
| *G06T 19/20* | (2011.01) |
| *G06V 10/774* | (2022.01) |
| *G06V 10/82* | (2022.01) |
| *G06V 40/16* | (2022.01) |

(52) U.S. Cl.
CPC ............ *G06T 19/20* (2013.01); *G06V 10/774* (2022.01); *G06V 10/82* (2022.01); *G06V 40/171* (2022.01); *G06T 2219/2024* (2013.01)

(58) Field of Classification Search
CPC ............ G06T 19/20; G06T 2219/2024; G06V 10/774; G06V 10/82; G06V 40/171
See application file for complete search history.

(56) References Cited

U.S. PATENT DOCUMENTS

| | | | | |
|---|---|---|---|---|
| 11,217,036 | B1 * | 1/2022 | Albuz ..................... | G06T 19/20 |
| 12,327,188 | B2 * | 6/2025 | Kalarot .............. | G06F 3/04845 |
| 2018/0300927 | A1 * | 10/2018 | Hushchyn ............ | G06V 40/167 |
| 2018/0350155 | A1 * | 12/2018 | Norwood ............ | H04L 63/0421 |
| 2019/0340419 | A1 * | 11/2019 | Milman ................. | G06N 20/00 |
| 2021/0383585 | A1 * | 12/2021 | Zhao ..................... | G06F 18/214 |
| 2021/0407193 | A1 * | 12/2021 | Gomer ................... | G06T 15/04 |
| 2022/0156987 | A1 * | 5/2022 | Chandran ............ | G06T 11/001 |

(Continued)

OTHER PUBLICATIONS

Rosu, et al., "Neural Strands: Learning Hair Geometry and Appearance from Multi-View Images", In Repository of arXiv:2207. 14067v1, Jul. 28, 2022, 17 Pages.

(Continued)

*Primary Examiner* — YuJang Tswei \
(74) *Attorney, Agent, or Firm* — Workman Nydegger

(57) ABSTRACT

A system for facilitating eyebrow style representation is configurable to access a set of eyebrow models that each include a set of eyebrow strands and to generate a set of eyebrow style maps by processing the set of eyebrow strands of a respective eyebrow model using a strand encoder that is configured to reduce 3D eyebrow strand input to latent eyebrow strand representation output. The system is further configurable to train an eyebrow style neural network using the set of eyebrow style maps as training data. Training the eyebrow style neural network provides (i) an eyebrow style encoder configured to reduce eyebrow style map input to latent eyebrow style representation output, (ii) a set of latent eyebrow style representations based on the set of eyebrow style maps, and (iii) an eyebrow style decoder configured to reconstruct eyebrow style map output from latent eyebrow style representation input.

16 Claims, 10 Drawing Sheets

(56)     References Cited

U.S. PATENT DOCUMENTS

| | | | |
|---|---|---|---|
| 2022/0292772 A1* | 9/2022 | Wang ..................... | G06N 3/045 |
| 2022/0292774 A1* | 9/2022 | Yang ....................... | G06N 3/09 |
| 2024/0029354 A1* | 1/2024 | Cheng ................ | G06V 10/7715 |

OTHER PUBLICATIONS

Saito, et al., "3D Hair Synthesis Using Volumetric Variational Autoencoders", In Journal of ACM Transactions on Graphics, vol. 37, Issue 6, Article 208, Nov. 2018., 12 Pages.
Zhou, et al., "HairNet: Single-View Hair Reconstruction using Convolutional Neural Networks", In Proceedings of 15th European Conference on Computer Vision, Sep. 8, 2018, 17 Pages.

* cited by examiner

System
100

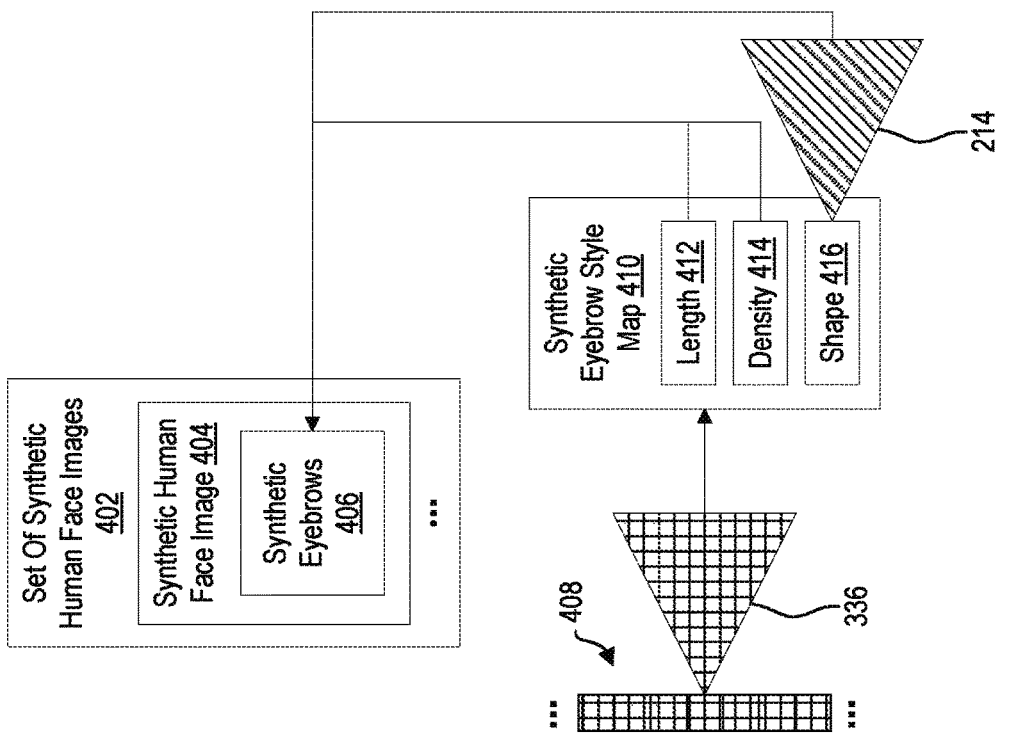
*FIG. 4A*

Figure 6:
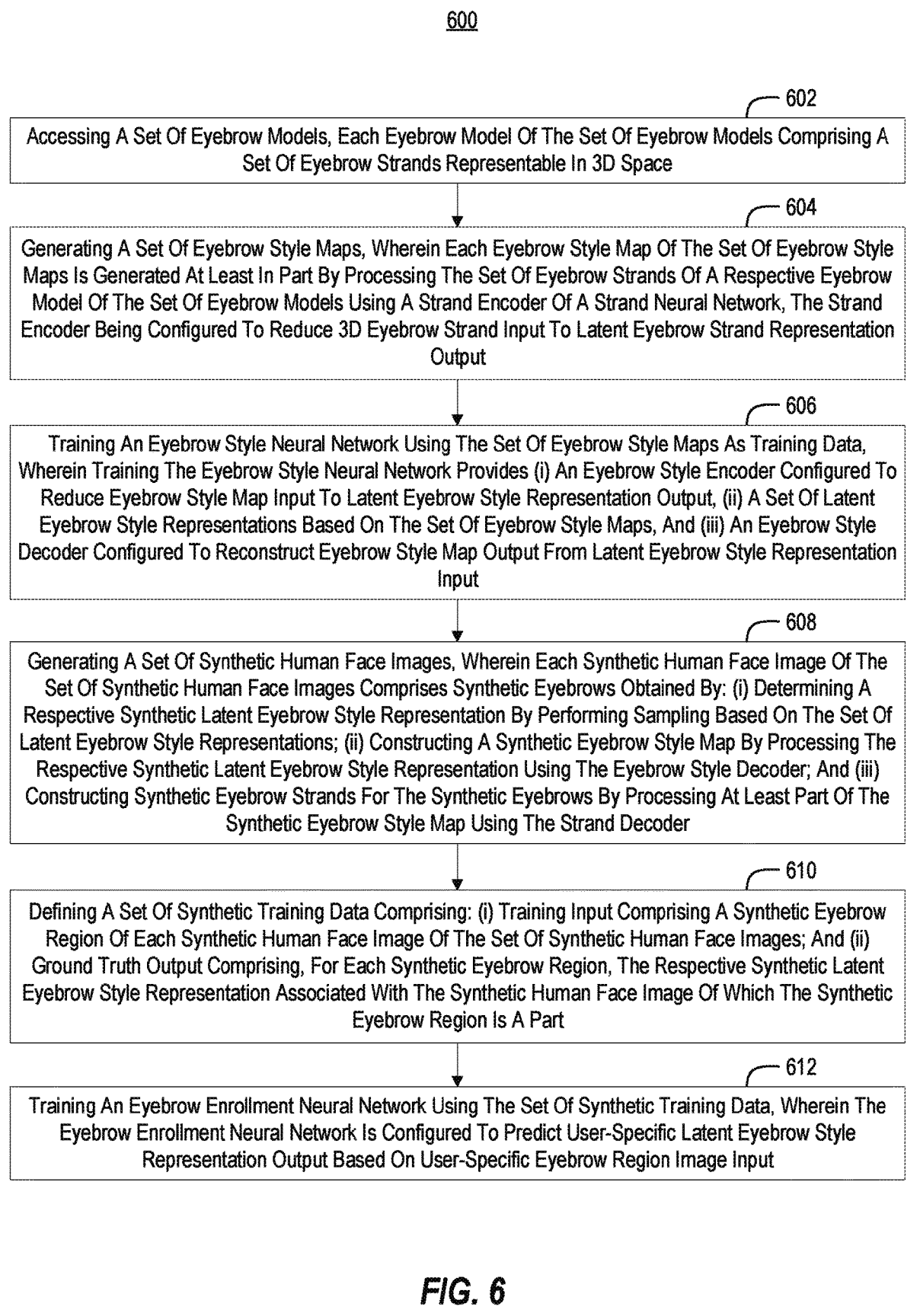

600

602

Accessing A Set Of Eyebrow Models, Each Eyebrow Model Of The Set Of Eyebrow Models Comprising A Set Of Eyebrow Strands Representable In 3D Space

604

Generating A Set Of Eyebrow Style Maps, Wherein Each Eyebrow Style Map Of The Set Of Eyebrow Style Maps Is Generated At Least In Part By Processing The Set Of Eyebrow Strands Of A Respective Eyebrow Model Of The Set Of Eyebrow Models Using A Strand Encoder Of A Strand Neural Network, The Strand Encoder Being Configured To Reduce 3D Eyebrow Strand Input To Latent Eyebrow Strand Representation Output

606

Training An Eyebrow Style Neural Network Using The Set Of Eyebrow Style Maps As Training Data, Wherein Training The Eyebrow Style Neural Network Provides (i) An Eyebrow Style Encoder Configured To Reduce Eyebrow Style Map Input To Latent Eyebrow Style Representation Output, (ii) A Set Of Latent Eyebrow Style Representations Based On The Set Of Eyebrow Style Maps, And (iii) An Eyebrow Style Decoder Configured To Reconstruct Eyebrow Style Map Output From Latent Eyebrow Style Representation Input

608

Generating A Set Of Synthetic Human Face Images, Wherein Each Synthetic Human Face Image Of The Set Of Synthetic Human Face Images Comprises Synthetic Eyebrows Obtained By: (i) Determining A Respective Synthetic Latent Eyebrow Style Representation By Performing Sampling Based On The Set Of Latent Eyebrow Style Representations; (ii) Constructing A Synthetic Eyebrow Style Map By Processing The Respective Synthetic Latent Eyebrow Style Representation Using The Eyebrow Style Decoder; And (iii) Constructing Synthetic Eyebrow Strands For The Synthetic Eyebrows By Processing At Least Part Of The Synthetic Eyebrow Style Map Using The Strand Decoder

610

Defining A Set Of Synthetic Training Data Comprising: (i) Training Input Comprising A Synthetic Eyebrow Region Of Each Synthetic Human Face Image Of The Set Of Synthetic Human Face Images; And (ii) Ground Truth Output Comprising, For Each Synthetic Eyebrow Region, The Respective Synthetic Latent Eyebrow Style Representation Associated With The Synthetic Human Face Image Of Which The Synthetic Eyebrow Region Is A Part

612

Training An Eyebrow Enrollment Neural Network Using The Set Of Synthetic Training Data, Wherein The Eyebrow Enrollment Neural Network Is Configured To Predict User-Specific Latent Eyebrow Style Representation Output Based On User-Specific Eyebrow Region Image Input

Figure 7:
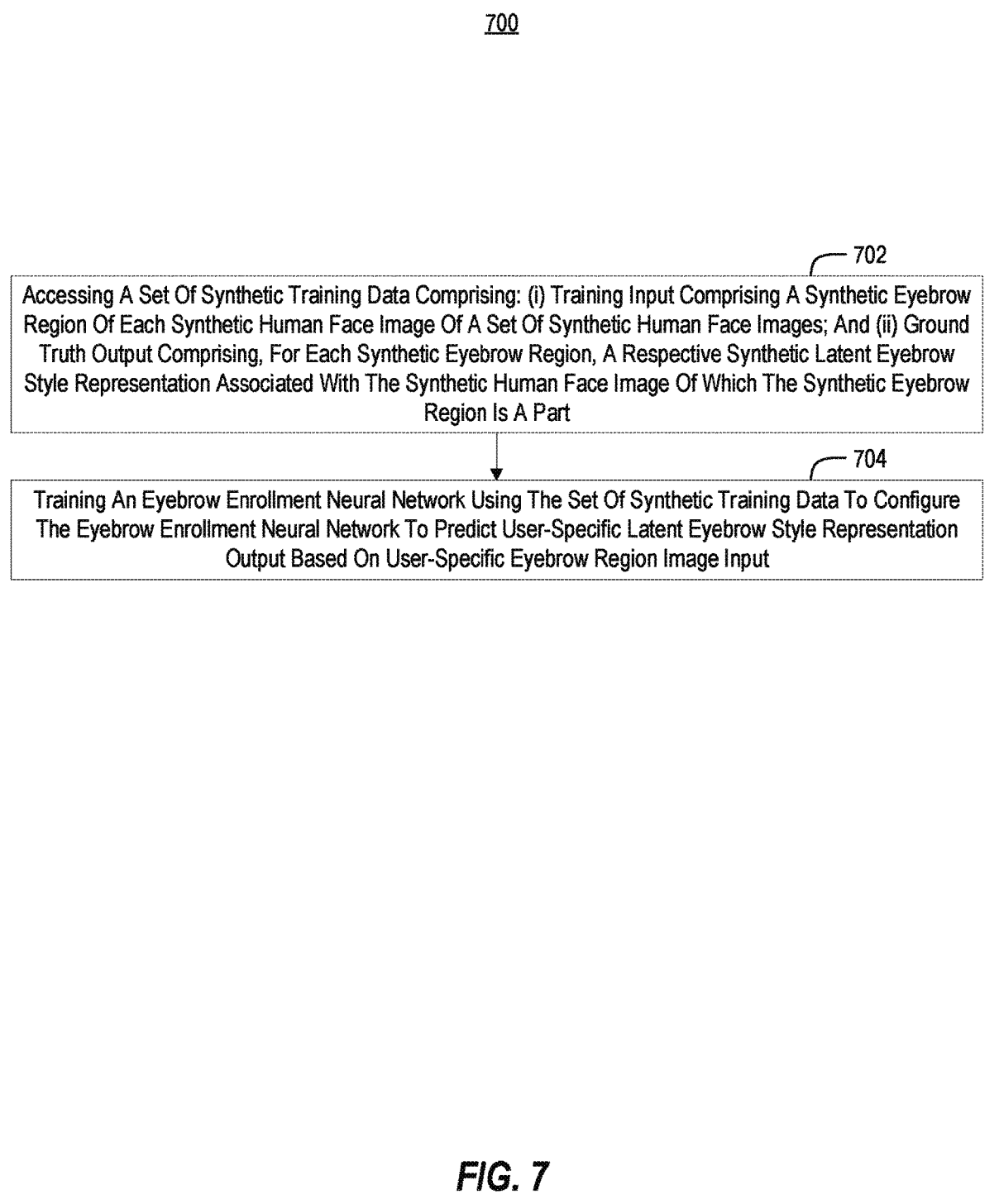

Accessing A Set Of Synthetic Training Data Comprising: (i) Training Input Comprising A Synthetic Eyebrow Region Of Each Synthetic Human Face Image Of A Set Of Synthetic Human Face Images; And (ii) Ground Truth Output Comprising, For Each Synthetic Eyebrow Region, A Respective Synthetic Latent Eyebrow Style Representation Associated With The Synthetic Human Face Image Of Which The Synthetic Eyebrow Region Is A Part

704

Training An Eyebrow Enrollment Neural Network Using The Set Of Synthetic Training Data To Configure The Eyebrow Enrollment Neural Network To Predict User-Specific Latent Eyebrow Style Representation Output Based On User-Specific Eyebrow Region Image Input

PARAMETRIC EYEBROW REPRESENTATION AND ENROLLMENT FROM IMAGE INPUT

BACKGROUND

Virtual avatars are digital representations or characters that users can control or manipulate in a virtual environment. Virtual avatars can take on various forms, ranging from realistic representations of individual users to entirely fictional or stylized characters. Virtual avatars are used in various contexts and serve various purposes. For instance, virtual avatars are commonly used in gaming, virtual reality (VR) and augmented reality (AR) and other extended reality (XR) experiences, online communications such as virtual meetings or conferences, social media, education, training, healthcare, and/or others.

In many use cases, users desire to utilize virtual avatars (or simply "avatars") with visual characteristics that closely resemble their own real-world physical appearance. As used herein, "lifelike" avatars refer to virtual avatars that attempt to capture the real-world physical appearance of a user, so as to visually resemble the user. A user may prefer to utilize a lifelike avatar in various circumstances, such as when engaging in social interactions in a virtual environment. Using lifelike avatars can help users more easily recognize one another's identity, have more authentic virtual interactions, and can improve the diversity of physical characteristics of avatars in virtual spaces.

Various approaches exist for enabling users to design or customize a virtual avatar for themselves. Existing approaches are associated with many challenges. For instance, some approaches provide users with customization tools that enable users to select or modify premade visual features for constructing a virtual avatar, such as the style, size, length, and/or shape of hair, eyebrows, eyes, nose, mouth, ears, and/or other facial features. The premade visual features offered to users for designing a virtual avatar are often limited, which can make it difficult for users to design an avatar that closely captures their likeness. On the other hand, when numerous design choices are offered to users, the avatar design process can become time-consuming and/or overwhelming for users.

The subject matter claimed herein is not limited to embodiments that operate only in environments or contexts such as those described above. Rather, this background is only provided to illustrate one example technology area where some embodiments described herein may be practiced.

BRIEF DESCRIPTION OF THE DRAWINGS

To describe how the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which:

FIGS. 4A and 4B illustrate a conceptual representation of generating synthetic training data to train an eyebrow enrollment neural network.

FIGS. 6, 7, and 8 illustrate example flow diagrams depicting acts associated with parametric eyebrow representation and enrollment from image input, in accordance with implementations of the disclosed subject matter.

DETAILED DESCRIPTION

Figure 1:
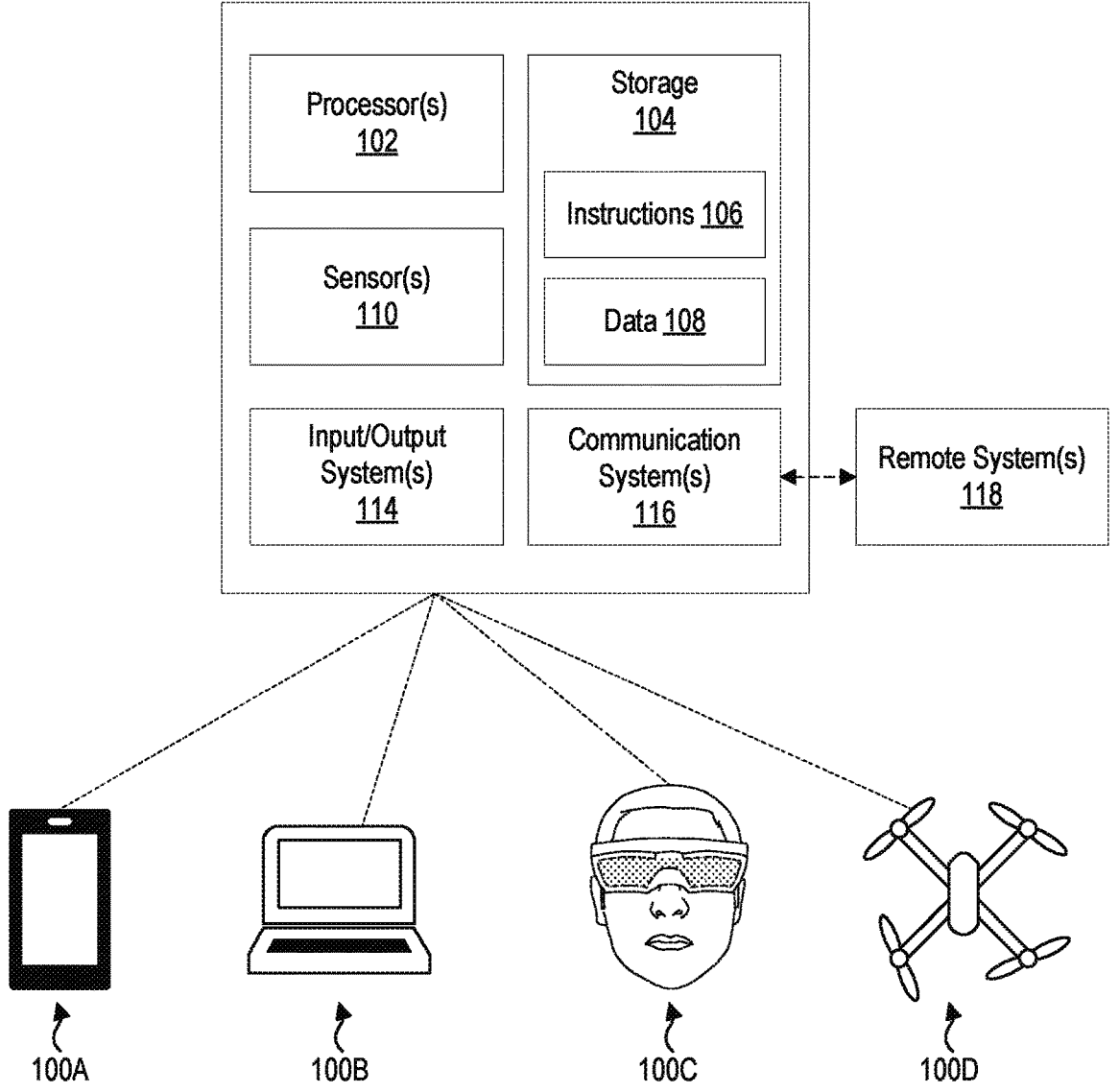
FIG. 1 illustrates example components of an example system that may include or be used to implement one or more disclosed embodiments.

Disclosed embodiments are generally directed to systems, methods, and apparatuses associated with parametric eyebrow representation and enrollment from image input.

Examples of Technical Benefits, Improvements, and Practical Applications

As noted above, various challenges exist in conventional approaches for selecting or designing visual characteristics of lifelike virtual avatars for users. For instance, to design an avatar with eyebrows that capture the likeness of the user's real-world eyebrows, conventional approaches would enable the user to select virtual eyebrows for their avatar from a set of premade virtual eyebrows that have different styles, lengths, positions, etc. When few premade virtual eyebrows are provided for the user to select from, virtual avatars can be limited in their ability to visually resemble real-world users. When numerous virtual eyebrows are presented for the user to select from, the user can become overwhelmed with the task of analyzing each set of virtual eyebrows to assess similarity to their own eyebrows.

At least some disclosed embodiments are directed to parametric eyebrow representations that can enable eyebrow enrollment from image input. For instance, an eyebrow style neural network can be trained by accessing a set of eyebrow models. Each eyebrow model of the set of eyebrow models can include a set of eyebrow strands representable in 3D space. A set of eyebrow style maps can then be generated. Each eyebrow style map can be generated by processing the set of eyebrow strands of a respective eyebrow model using a strand encoder of a strand neural network. The strand encoder can be configured to reduce 3D eyebrow strand input to latent eyebrow strand representation output.

The eyebrow style neural network can then be trained using the set of eyebrow style maps as training data. Training the eyebrow style neural network can result in (i) an eyebrow style encoder configured to reduce eyebrow style map input to latent eyebrow style representation output, (ii) a set of latent eyebrow style representations based on the set of eyebrow style maps, and (iii) an eyebrow style decoder configured to reconstruct eyebrow style map output from latent eyebrow style representation input.

Synthetic training data may then be generated, which may then be used to train an eyebrow enrollment neural network. For instance, a set of synthetic human face images may be generated, and each synthetic human face image can include synthetic eyebrows. The synthetic eyebrows can be obtained by (i) determining a respective synthetic latent eyebrow style representation by performing sampling based on the set of latent eyebrow style representations; (ii) constructing a synthetic eyebrow style map by processing the respective synthetic latent eyebrow style representation using the eyebrow style decoder; and (iii) constructing synthetic eyebrow strands for the synthetic eyebrows by processing at least part of the synthetic eyebrow style map using a strand decoder (associated with the strand encoder noted above). The set of synthetic training data can be defined to include training input that includes a synthetic eyebrow region of each synthetic human face image of the set of synthetic human face images. The set of synthetic training data can also include ground truth output that includes, for each synthetic eyebrow region, the respective synthetic latent eyebrow style representation associated with the synthetic human face image of which the synthetic eyebrow region is a part.

The eyebrow enrollment neural network can then be trained using the set of synthetic training data, thereby configuring the eyebrow enrollment neural network to predict user-specific latent eyebrow style representation output based on user-specific eyebrow region image input. For instance, an image of the face of a user may be captured, and a user-specific eyebrow region image may be identified from the image of the user's face. The user-specific eyebrow region image can be used as input to the eyebrow enrollment neural network. Responsive to this input, the eyebrow enrollment neural network can predict a user-specific latent eyebrow style representation (e.g., latent code or a latent distribution). The user-specific latent eyebrow style representation can be decoded by the eyebrow style decoder (obtained by training the eyebrow style neural network) to reconstruct a user-specific eyebrow style map. The user-specific eyebrow style map can be decoded by the strand decoder to reconstruct a set of eyebrow strands for a user-specific eyebrow model. The user-specific eyebrow model can be applied to or used in conjunction with a virtual avatar that represents the user.

The parametric eyebrow representation functionality described herein can facilitate various benefits, such as providing a greater breadth of eyebrow styles and representations that may be selected or sampled from to obtain a user-specific eyebrow model for a virtual avatar. This can improve the ability of virtual avatars to visually resemble human users with diverse visual characteristics, which can improve social interactions and/or other aspects of virtual experiences. While providing greater eyebrow style breadth, the eyebrow enrollment functionality described herein can leverage a user face image to facilitate acquisition of a user-specific eyebrow model, which can help users avoid a tedious and/or time-consuming eyebrow style selection process.

Although various examples provided herein focus, in at least some respects, on parametric representation and enrollment of eyebrows, the principles described herein can be applied in other contexts, such as for facilitating parametric representation and/or enrollment of head hair, facial hair, or other strand-based or hair-based structures.

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise one or more computer-readable recording media and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), other devices (e.g., self-driving vehicles, servers), combinations thereof, etc. A system 100 may take on other forms in accordance with the present disclosure.

Parametric Eyebrow Representation and Enrollment from Image Input

Figure 2:
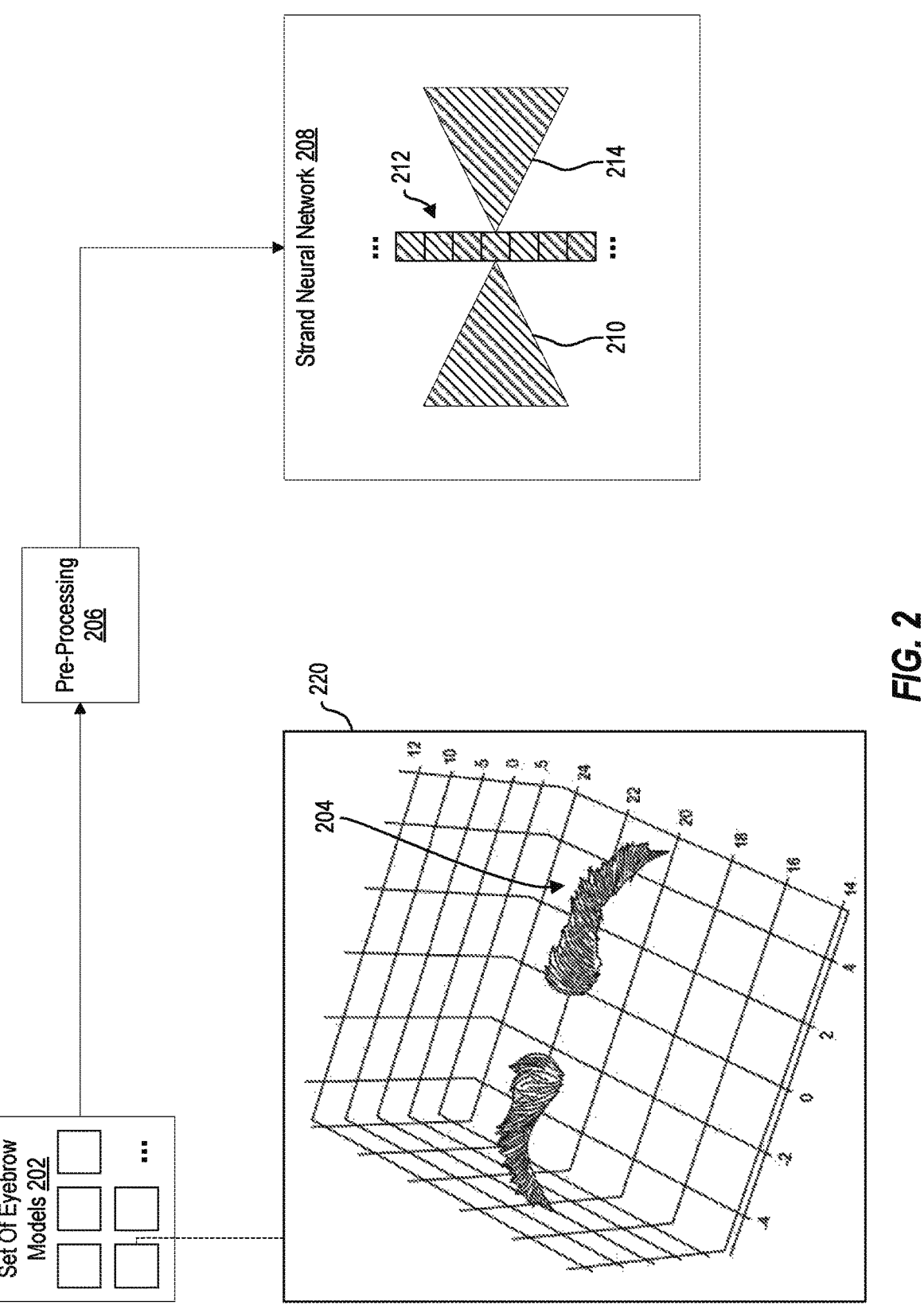
FIG. 2 illustrates a conceptual representation of training a strand neural network using eyebrow model data.

FIG. 2 illustrates a conceptual representation of training a strand neural network 208 using eyebrow model data. For instance, FIG. 2 illustrates a set of eyebrow models 202, with individual squares illustrated within the set of eyebrow models 202 representing separate eyebrow models. FIG. 2 provides a conceptual illustration 220 of one of the eyebrow models of the set of eyebrow models 202. The conceptual illustration 220 shows the eyebrow model as including a set of eyebrow strands 204 that are representable in 3D space.

The set of eyebrow models 202 can include eyebrow models that are human-authored and/or eyebrow models that are computer-generated. For instance, a set of human-authored eyebrow models can be supplemented by using the human-authored eyebrow models to generate additional eyebrow models (e.g., by perturbing characteristics of the human-authored eyebrow models). A set of eyebrow models 202 can include any quantity of eyebrow models and can include human-authored eyebrow models, computer-generated eyebrow models, and/or combinations thereof, as indicated in FIG. 2 by the ellipsis within the set of eyebrow models.

The set of eyebrow models 202 can provide a basis for training a strand neural network 208, which may be used to facilitate parametric representation of eyebrows and/or eyebrow enrollment from image input, as will be described in more detail hereinafter. FIG. 2 illustrates pre-processing 206 performed on the set of eyebrow models 202 and conceptually shows the pre-processed set of eyebrow models being used as training data to train a strand neural network 208. The pre-processing 206 may include various operations such as, by way of non-limiting example, mirroring the eyebrow strands (e.g., across an x-axis to exploit eyebrow symmetry to reduce computational complexity), subtracting the start position of each eyebrow strand (e.g., to cause all strands to originate at a common point), normalizing the length of each eyebrow strand (e.g., to allow for focusing on direction and curvature or shape information for each strand), and/or others.

The strand neural network 208 can include various components and can take on various forms. In the example of FIG. 2, the strand neural network 208 includes a strand encoder 210 that is configured to reduce 3D eyebrow strand input (e.g., pre-processed strand information indicating direction and curvature for eyebrow strands) into a latent eyebrow strand representation 212. The latent eyebrow strand representation 212 can include latent code (e.g., a set of numbers) that represents features/aspects (e.g., shape) of the eyebrow strand input. The strand neural network 208 of FIG. 2 also includes a strand decoder that is configured to reconstruct 3D eyebrow strands from latent eyebrow strand representations 212. For instance, by processing a set of latent eyebrow strand representations 212, the strand decoder 214 can output 3D eyebrow strand data (e.g., indicating strand shape, which can be normalized in length and/or position), which can be used in conjunction with position and/or length data to provide a 3D eyebrow strand usable in an eyebrow model (e.g., for use on a virtual avatar).

In some implementations, the strand neural network 208 comprises a variational autoencoder (VAE), though other types of neural networks can be used such as, by way of non-limiting example, autoencoders, generative adversarial networks (GANs), flow-based models, Helmholtz machines, Wasserstein autoencoders, and/or others.

Figure 3A:
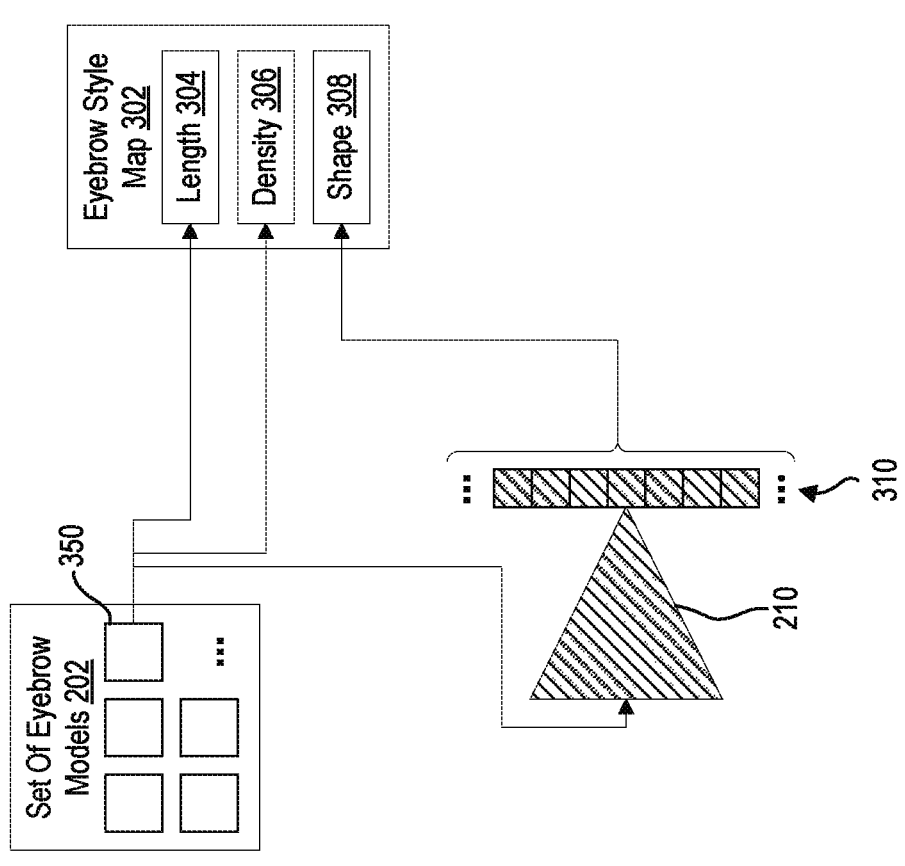
FIG. 3A illustrates a conceptual representation of generating an eyebrow style map using eyebrow model data and a strand encoder.

Components of the strand neural network 208 can be used to provide a parametric representation of eyebrows (e.g., eyebrow style maps). FIG. 3A illustrates a conceptual representation of generating an eyebrow style map 302 using eyebrow model data and a strand encoder. In particular, FIG. 3A shows the set of eyebrow models 202 from FIG. 2 and conceptually illustrates strand data of a particular eyebrow model 350 being used to determine a length component 304 and a density component 306 of an eyebrow style map 302. For example, the length of individual strands of the particular eyebrow model 350 can be used to construct a length map that represents the length of strands at different positions with pixel values of a 2D image (or image channel) of the eyebrows (2D image positions for pixels of the length map may be obtained from the 3D particular eyebrow model 350 based on UV coordinates of a face mesh that the eyebrows are attached/attachable to). The length component 304 of the eyebrow style map 302 may comprise such a length map.

Similarly, the start position of the individual strands can be used to construct a density map that represents the density of strands at different positions with pixel values of a 2D image (or image channel) of the eyebrows (2D image positions for pixels of the density map may be obtained from the 3D particular eyebrow model 350 based on UV coordinates of a face mesh that the eyebrows are attached/attachable to). The density component 306 of the eyebrow style map 302 may comprise such a density map. In this way, the length component 304 and/or the density component 306 may be directly measured from the particular eyebrow model 350.

FIG. 3A also conceptually illustrates strand data of the particular eyebrow model 350 being used as input to the strand encoder 210 of the strand neural network 208 to process the eyebrow strands to obtain latent eyebrow strand representations 310. The latent eyebrow strand representations 310 may comprise latent code that represents features/aspects (e.g., shape) of the individual input eyebrow strands. The latent code for strands at different positions may inform pixel values of a 2D image (or image channel) of the eyebrows to form a shape map, and the shape map may be used as the shape component 308 of the eyebrow style map 302.

The eyebrow style map 302 may comprise a parametric representation of eyebrow characteristics. In some implementations, the eyebrow style map 302 comprises a 2D image with multiple channels corresponding to the different components thereof. For instance, the eyebrow style map 302 may comprise a 2D image with a length channel that includes pixel values of the length component 304, a density channel that includes pixel values of the density component 306, and a shape channel that includes pixel values of the shape component 308. An eyebrow style map 302 (and/or components thereof) may be represented in other forms as well.

The operations performed to obtain the eyebrow style map 302 using the particular eyebrow model 350 may be performed on multiple eyebrow models of the set of eyebrow models 202 to obtain multiple eyebrow style maps, and the multiple eyebrow style maps may form a set of eyebrow style maps 320. The acquisition and presence of the multiple eyebrow style maps associated with different eyebrow models of the set of eyebrow models 202 is indicated in FIG. 3B by the ellipsis within the set of eyebrow style maps 320.

Figure 3B:
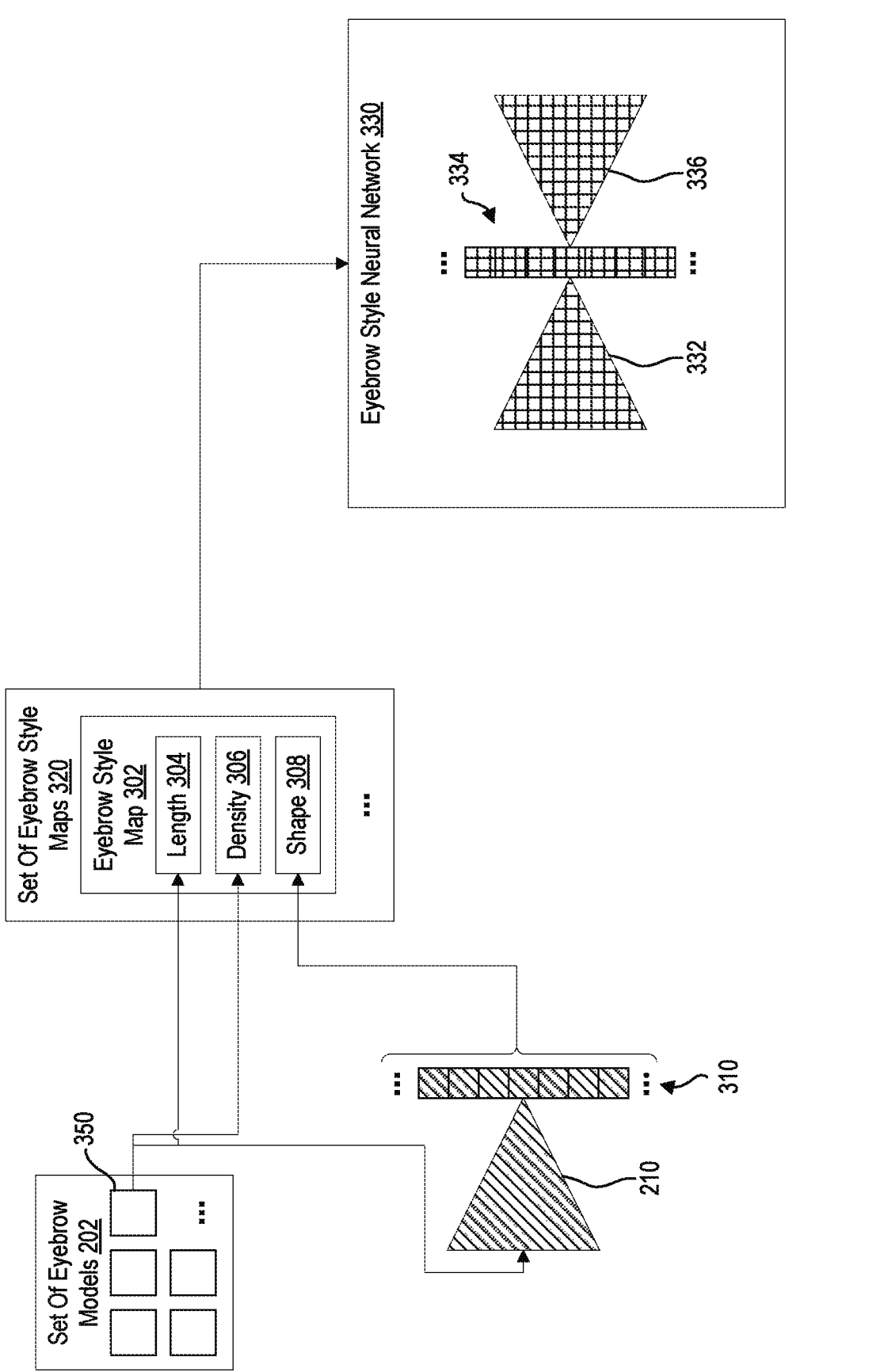
FIG. 3B illustrates a conceptual representation of training an eyebrow style neural network using a set of eyebrow style maps.

FIG. 3B also conceptually shows the set of eyebrow style maps 320 being used to train an eyebrow style neural network 330. In some instances, the eyebrow style neural network 330 comprises a variational autoencoder (e.g., similar to the strand neural network), though other types of neural networks may be utilized (e.g., similar to the alternative network architectures discussed hereinabove with reference to the strand neural network). In the example of FIG. 3B, training the eyebrow style neural network 330 utilizing the set of eyebrow style maps 320 provides various elements, such as an eyebrow style encoder 332, a set of latent eyebrow style representations 334, and an eyebrow style decoder 336.

The eyebrow style encoder 332 is configured to reduce eyebrow style map input (e.g., including length, density, and shape components) into a latent eyebrow style representation, which may include latent code that represents features/aspects of the eyebrow style map input. The set of latent eyebrow style representations 334 may comprise latent code obtained by processing the various eyebrow style maps of the set of eyebrow style maps 320 using the eyebrow style encoder 332. The eyebrow style decoder 336 is configured to reconstruct eyebrow style maps from latent eyebrow style representations (e.g., latent code representative of features/aspects of eyebrow style maps).

Although FIGS. 3A and 3B focus on an example in which the same set of eyebrow models 202 is used to facilitate training of a strand neural network 208 and an eyebrow style neural network 330, different sets of eyebrow models may be used to train the different neural networks.

Given eyebrow style latent code, the eyebrow style decoder 336 may be used to reconstruct an eyebrow style map using the eyebrow style latent code. The eyebrow style map can include a length component, a density component, and a shape component that provides eyebrow strand latent code. The strand decoder 214 may process the eyebrow strand latent code to reconstruct strand shape information for eyebrow strands of an eyebrow model. The strand shape information may be used in conjunction with the length component and the density component to provide an eyebrow model (e.g., usable in conjunction with a virtual avatar or other 3D model).

Figure 4B:
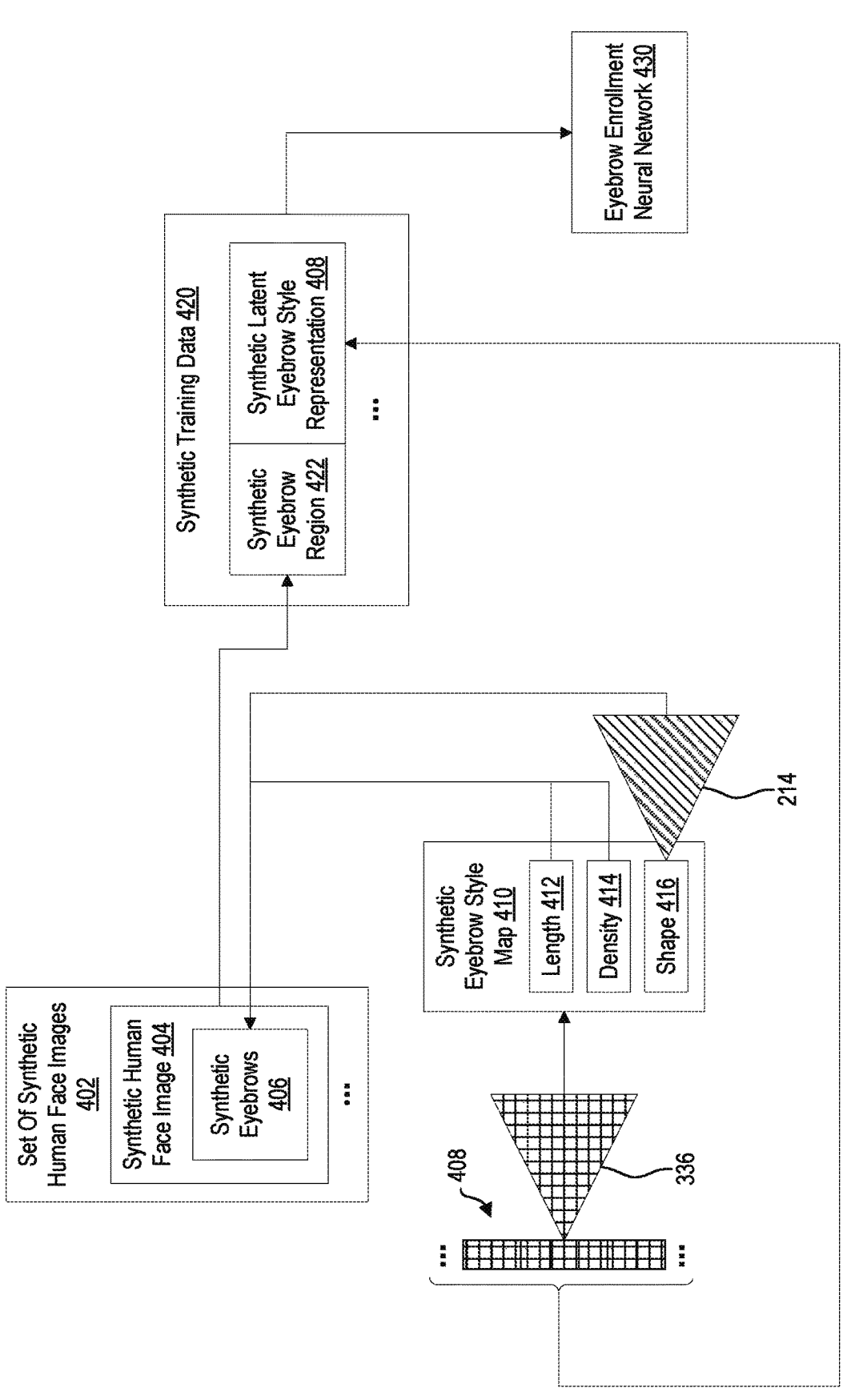

Eyebrow style latent code (or eyebrow style latent representation(s)) can be estimated/predicted for users using an eyebrow enrollment neural network, and the eyebrow style latent code may be processed above to obtain an eyebrow model for the user. FIGS. 4A and 4B illustrate a conceptual representation of generating synthetic training data 420 to train an eyebrow enrollment neural network 430. In particular, FIG. 4A illustrates a set of synthetic human face images 402, which can include any quantity of synthetic human face images (as indicated by the ellipsis within the set of synthetic human face images 402). The set of synthetic human face images 402 can be generated using any suitable processing pipeline, such as a conventional graphics pipeline.

The processing pipeline for generating the set of synthetic human face images 402 can be modified to cause each synthetic human face image to have synthetic eyebrows generated based on eyebrow style latent code. For instance, FIG. 4A illustrates a particular synthetic human face image 404 of the set of synthetic human face images 402. The particular synthetic human face image 404 includes synthetic eyebrows 406 that are generated based on a particular synthetic latent eyebrow style representation 408. The particular synthetic latent eyebrow style representation 408 includes eyebrow style latent code selected from or sampled based on the set of latent eyebrow style representations 334 established pursuant to training the eyebrow style neural network 330 (discussed hereinabove with reference to FIG. 3B). For example, the eyebrow style latent code may be sampled from the continuous eyebrow style latent space associated with the set of latent eyebrow style representations 334, or may be selected from among the set of latent eyebrow style representations 334.

The particular synthetic latent eyebrow style representation 408 (e.g., associated with the particular synthetic human face image 404 and/or synthetic eyebrows 406) can be decoded by the eyebrow style decoder 336 to construct a synthetic eyebrow style map 410 (e.g., the eyebrow style decoder 336 being obtained pursuant to the training of the eyebrow style neural network 330 as discussed hereinabove with reference to FIG. 3B). Similar to the eyebrow style map 302 discussed above, the synthetic eyebrow style map 410 includes a length component 412, a density component 414, and a shape component 416. The shape component 416 may comprise latent eyebrow strand representations or eyebrow strand latent code. In the example of FIG. 4A, the shape component 416 of the synthetic eyebrow style map 410 is processed/decoded by the strand decoder 214 (e.g., discussed hereinabove with reference to FIG. 2) to obtain strand shape information. FIG. 4B conceptually depicts the strand shape information (e.g., output of the strand decoder 214), the density component 414, and the length component 412 being used to construct synthetic eyebrow strands for the synthetic eyebrows of the particular synthetic human face image 404. For example, the start positions (e.g., UV locations/coordinates) for the synthetic eyebrow strands may be sampled based on the density component 414 (e.g., a density map). These start positions may be mapped onto 3D points on a face mesh. The synthetic strands may originate from these 3D points and be given lengths based on the length component 412 (e.g., a length map) and shapes based on the shape information (obtained by processing the shape component 416 with the strand decoder 214).

Each synthetic human face image of the set of synthetic human face images 402 can include respective synthetic eyebrows obtained via techniques similar to those described for obtaining the synthetic eyebrows 406 for the particular synthetic human face image 404. In this way, each synthetic human face image (or the synthetic eyebrows thereof) can be associated with a respective synthetic latent eyebrow style representation (e.g., sampled or selected based on the set of latent eyebrow style representations 334 and/or the latent space thereof).

FIG. 4B illustrates synthetic training data 420 that includes a synthetic eyebrow region 422 obtained from the particular synthetic human face image 404 (e.g., an image crop) and the particular synthetic latent eyebrow style representation 408 associated with the synthetic eyebrow region 422 (or associated with the synthetic human face image 404 of which the synthetic eyebrow region 422 is a part). The synthetic training data 420 may include similar data sets derived from the other synthetic human face images of the set of synthetic human face images 402 (e.g., additional synthetic eyebrow region and synthetic latent eyebrow style representation data sets).

Each synthetic eyebrow region of the synthetic training data 420 may comprise training input, and the corresponding synthetic latent eyebrow style representation associated with each synthetic eyebrow region may comprise ground truth output. FIG. 4B conceptually depicts the synthetic training data 420 being used to train an eyebrow enrollment neural network 430 to configure the eyebrow enrollment neural network 430 to predict latent eyebrow style representation output based on eyebrow region image input. The eyebrow enrollment neural network 430 can comprise any suitable architecture, such as a DNN-based architecture, CNN-based architecture, ResNet-based architecture, combinations thereof, and/or others. The eyebrow enrollment neural network 430 can be trained using any suitable techniques, such as mean squared error loss, gaussian negative log-like loss (GNLL), and/or others.

Figure 5:
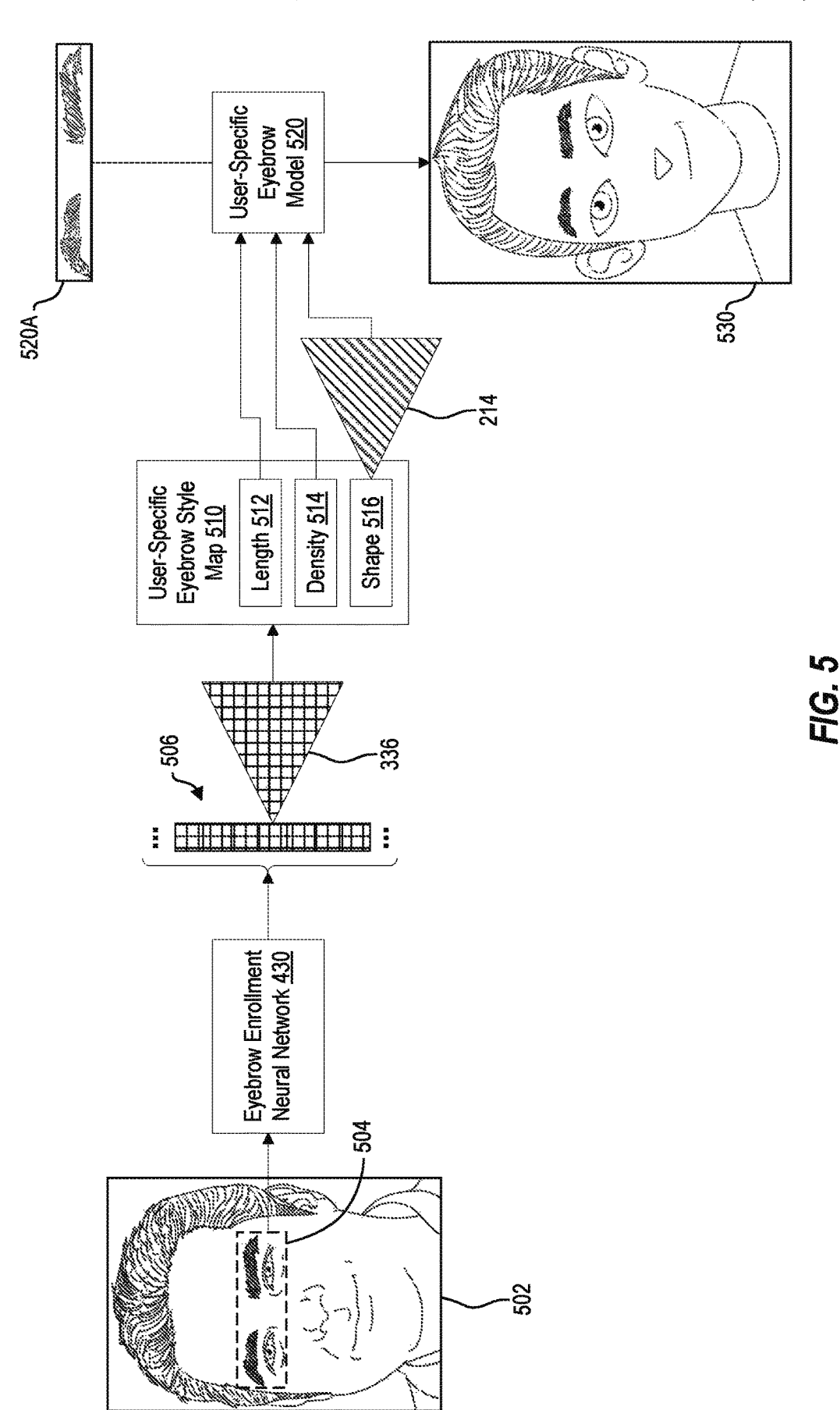
FIG. 5 illustrates a conceptual representation of performing eyebrow enrollment using an eyebrow enrollment neural network, in accordance with implementations of the disclosed subject matter.

The eyebrow enrollment neural network 430 can be used to facilitate acquisition of a user-specific eyebrow model for use on a user-specific virtual avatar. FIG. 5 illustrates a conceptual representation of performing eyebrow enrollment using the eyebrow enrollment neural network 430. In particular, FIG. 5 illustrates a user-specific image 502 that depicts a user. The user-specific image 502 may be acquired in any suitable manner, such as by prompting a user to use a device to capture the image, accessing a pre-stored image, etc. FIG. 5 furthermore depicts a user-specific eyebrow region 504, which may comprise a crop of the eyebrow region of the user-specific image 502.

In the example of FIG. 5, the user-specific eyebrow region 504 is used as input to the eyebrow enrollment neural network 430, which predicts a user-specific latent eyebrow style representation 506. The user-specific latent eyebrow style representation 506 can comprise specific eyebrow style latent code, or an eyebrow style latent distribution (e.g., mean or composited/interpolated latent code with variance in the components) to provide a number of plausible eyebrow variants for the same user, as well as a confidence for the plausible variants (e.g., when the eyebrow enrollment neural network 430 is trained using GNLL).

FIG. 5 furthermore depicts the user-specific latent eyebrow style representation 506 being processed by the eyebrow style decoder 336 to reconstruct a user-specific eyebrow style map 510. The user-specific eyebrow style map 510 of FIG. 5 includes a length component 512, a density component 514, and a shape component 516. In the example of FIG. 5, the shape component 516 is processed by the strand decoder 214 to obtain strand shape information for the user-specific eyebrow model 520. The length component 512 and the density component 514 are utilized in conjunction with the strand shape information to construct user-specific eyebrow strands for the user-specific eyebrow model 520. For example, the start positions (e.g., UV locations/coordinates) for the user-specific eyebrow strands may be sampled based on the density component 514 (e.g., a density map). These start positions may be mapped onto 3D points on a face mesh associated with the user (e.g., an avatar). The user-specific eyebrow strands may originate from these 3D points and be given lengths based on the length component 512 (e.g., a length map) and shapes based on the shape information (obtained by processing the shape component 516 with the strand decoder 214).

FIG. 5 provides a conceptual representation 520A of the user-specific eyebrow model 520, which has visual characteristics generally corresponding to the eyebrows of the user shown in the user-specific image 502. FIG. 5 furthermore illustrates that the user-specific eyebrow model 520 can be applied to an avatar 530 of the user, thereby allowing the avatar to have at least some facial characteristics to resemble facial characteristics of the user. Advantageously, the user-specific eyebrow model 520, which capture the likeness of the user's eyebrows, may be obtained without subjecting the user to an arduous eyebrow style selection process.

In some implementations, the eyebrow enrollment neural network 430 is further trained to predict eyebrow color and/or other secondary properties, which may also be used to form the user-specific eyebrow model 520.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 8:
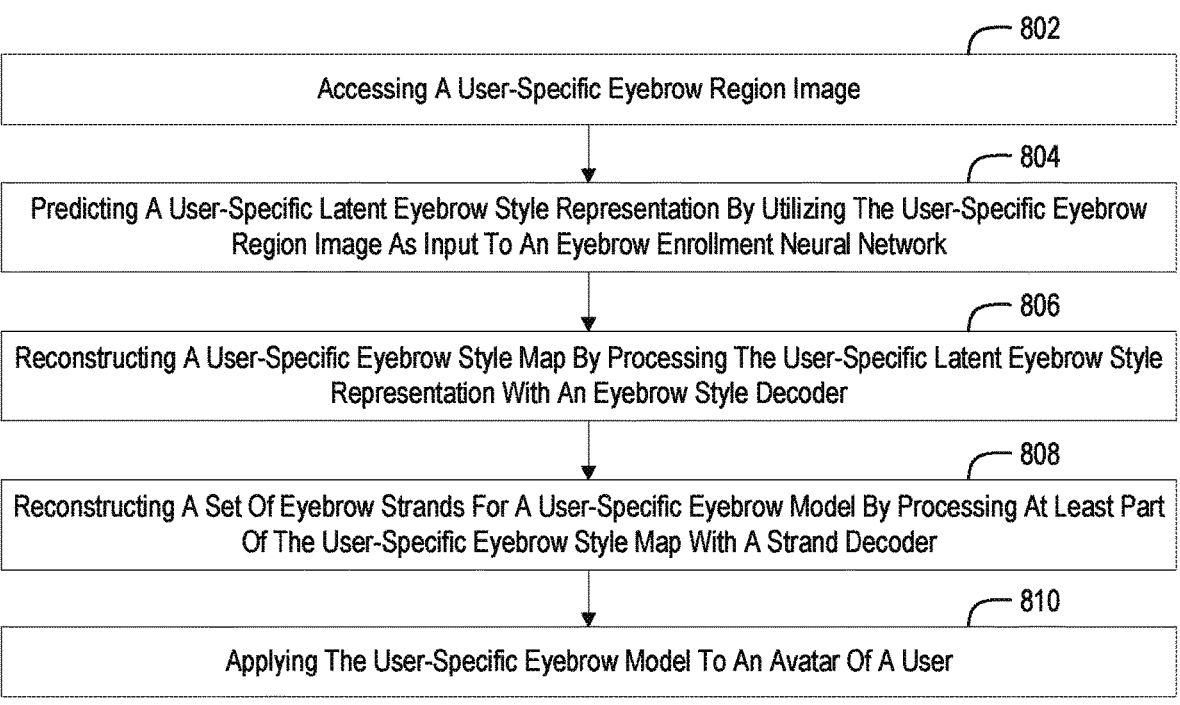

FIGS. 6, 7, and 8 illustrate example flow diagrams 600, 700, and 800, respectively, depicting acts associated with parametric eyebrow representation and enrollment from image input, in accordance with implementations of the disclosed subject matter.

Act 602 of flow diagram 600 of FIG. 6 includes accessing a set of eyebrow models, each eyebrow model of the set of eyebrow models comprising a set of eyebrow strands representable in 3D space. In some instances, at least some eyebrow models of the set of eyebrow models comprise a human-authored 3D eyebrow model.

Act 604 of flow diagram 600 includes generating a set of eyebrow style maps, wherein each eyebrow style map of the set of eyebrow style maps is generated at least in part by processing the set of eyebrow strands of a respective eyebrow model of the set of eyebrow models using a strand encoder of a strand neural network, the strand encoder being configured to reduce 3D eyebrow strand input to latent eyebrow strand representation output. In some implementations, each eyebrow style map of the set of eyebrow style maps comprises a length component, a density component, and a shape component. In some examples, the strand neural network comprises a variational autoencoder. In some instances, the strand neural network is trained using at least eyebrow strand data from the set of eyebrow models. In some implementations, the strand neural network further comprises a strand decoder configured to reconstruct 3D eyebrow strand output from latent eyebrow strand representation input. In some examples, the shape component is generated via the strand neural network, and the length component and the density component are measured directly from the respective eyebrow model of the set of eyebrow models.

Act 606 of flow diagram 600 includes training an eyebrow style neural network using the set of eyebrow style maps as training data, wherein training the eyebrow style neural network provides (i) an eyebrow style encoder configured to reduce eyebrow style map input to latent eyebrow style representation output, (ii) a set of latent eyebrow style representations based on the set of eyebrow style maps, and (iii) an eyebrow style decoder configured to reconstruct eyebrow style map output from latent eyebrow style representation input. In some instances, the eyebrow style neural network comprises a variational autoencoder.

Act 608 of flow diagram 600 includes generating a set of synthetic human face images, wherein each synthetic human face image of the set of synthetic human face images comprises synthetic eyebrows obtained by: (i) determining a respective synthetic latent eyebrow style representation by performing sampling based on the set of latent eyebrow style representations; (ii) constructing a synthetic eyebrow style map by processing the respective synthetic latent eyebrow style representation using the eyebrow style decoder; and (iii) constructing synthetic eyebrow strands for the synthetic eyebrows by processing at least part of the synthetic eyebrow style map using the strand decoder.

Act 610 of flow diagram 600 includes defining a set of synthetic training data comprising: (i) training input comprising a synthetic eyebrow region of each synthetic human face image of the set of synthetic human face images; and (ii) ground truth output comprising, for each synthetic eyebrow region, the respective synthetic latent eyebrow style representation associated with the synthetic human face image of which the synthetic eyebrow region is a part.

Act 612 of flow diagram 600 includes training an eyebrow enrollment neural network using the set of synthetic training data, wherein the eyebrow enrollment neural network is configured to predict user-specific latent eyebrow style representation output based on user-specific eyebrow region image input.

Act 702 of flow diagram 700 of FIG. 7 includes accessing a set of synthetic training data comprising: (i) training input comprising a synthetic eyebrow region of each synthetic human face image of a set of synthetic human face images; and (ii) ground truth output comprising, for each synthetic eyebrow region, a respective synthetic latent eyebrow style representation associated with the synthetic human face image of which the synthetic eyebrow region is a part. In some implementations, each synthetic human face image of the set of synthetic human face images comprises synthetic eyebrows obtained by: (i) determining a respective synthetic latent eyebrow style representation by performing sampling based on a set of latent eyebrow style representations; (ii) constructing a synthetic eyebrow style map by processing the respective synthetic latent eyebrow style representation using an eyebrow style decoder, where the eyebrow style decoder is configured to reconstruct eyebrow style map output from latent eyebrow style representation input; and (iii) constructing synthetic eyebrow strands for the synthetic eyebrows by processing at least part of the synthetic eyebrow style map using a strand decoder. In some examples, the set of latent eyebrow style representations and the eyebrow style decoder are generated by training an eyebrow style neural network using a set of eyebrow style maps as training data. In some instances, the set of eyebrow style maps is generated by processing a set of eyebrow strands of a respective eyebrow model of a set of eyebrow models using a strand encoder of a strand neural network, where the strand encoder configured to reduce 3D eyebrow strand input to latent eyebrow strand representation output. In some implementations, the strand neural network comprises the strand decoder, and the strand neural network is trained using at least eyebrow strand data from the set of eyebrow models.

Act 704 of flow diagram 700 includes training an eyebrow enrollment neural network using the set of synthetic training data to configure the eyebrow enrollment neural network to predict user-specific latent eyebrow style representation output based on user-specific eyebrow region image input.

Act 802 of flow diagram 800 of FIG. 8 includes accessing a user-specific eyebrow region image.

Act 804 of flow diagram 800 includes predicting a user-specific latent eyebrow style representation by utilizing the user-specific eyebrow region image as input to an eyebrow enrollment neural network. In some examples, the eyebrow enrollment neural network is trained using a set of synthetic training data comprising: (i) training input comprising a synthetic eyebrow region of each synthetic human face image of a set of synthetic human face images; and (ii) ground truth output comprising, for each synthetic eyebrow region, a respective synthetic latent eyebrow style representation associated with the synthetic human face image of which the synthetic eyebrow region is a part.

Act 806 of flow diagram 800 includes reconstructing a user-specific eyebrow style map by processing the user-specific latent eyebrow style representation with an eyebrow style decoder. In some instances, the eyebrow style decoder is generated by training an eyebrow style neural network using a set of eyebrow style maps as training data.

Act 808 of flow diagram 800 includes reconstructing a set of eyebrow strands for a user-specific eyebrow model by processing at least part of the user-specific eyebrow style map with a strand decoder.

Act 810 of flow diagram 800 includes applying the user-specific eyebrow model to an avatar of a user.

Additional Details Related to the Disclosed Embodiments

Disclosed embodiments may comprise or utilize a special-purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "computer-readable recording media", "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry program code in the form of computer-executable instructions or data structures, and which can be accessed by a general-purpose or special-purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A system for training one or more neural networks for eyebrow style representation, the system comprising:

one or more processors; and one or more computer-readable recording media that store instructions that are executable by the one or more processors to configure the system to:

access a set of eyebrow models, each eyebrow model of the set of eyebrow models comprising a set of eyebrow strands representable in 3D space;

generate a set of eyebrow style maps, wherein each eyebrow style map of the set of eyebrow style maps comprises a length component, a density component, and a shape component, wherein the shape component of each eyebrow style map of the set of eyebrow style maps is generated by processing the set of eyebrow strands of a respective eyebrow model of the set of eyebrow models using a strand encoder of a strand neural network, the strand encoder being configured to reduce 3D eyebrow strand input to latent eyebrow strand representation output, wherein the length component and the density component of each eyebrow style map of the set of eyebrow style maps are measured directly from the respective eyebrow model of the set of eyebrow models; and train an eyebrow style neural network using the set of eyebrow style maps as training data, wherein training the eyebrow style neural network provides (i) an eyebrow style encoder configured to reduce eyebrow style map input to latent eyebrow style representation output, (ii) a set of latent eyebrow style representations based on the set of eyebrow style maps, and (iii) an eyebrow style decoder configured to reconstruct eyebrow style map output from latent eyebrow style representation input.

2. The system of claim 1, wherein at least some eyebrow models of the set of eyebrow models comprise a human-authored 3D eyebrow model.

3. The system of claim 1, wherein the eyebrow style neural network comprises a variational autoencoder.

4. The system of claim 1, wherein the strand neural network comprises a variational autoencoder.

5. The system of claim 1, wherein the strand neural network is trained using at least eyebrow strand data from the set of eyebrow models.

6. The system of claim 1, wherein the strand neural network further comprises a strand decoder configured to reconstruct 3D eyebrow strand output from latent eyebrow strand representation input.

7. The system of claim 6, wherein the instructions are executable by the one or more processors to further configure the system to:

generate a set of synthetic human face images, wherein each synthetic human face image of the set of synthetic human face images comprises synthetic eyebrows obtained by:

determining a respective synthetic latent eyebrow style representation by performing sampling based on the set of latent eyebrow style representations;

constructing a synthetic eyebrow style map by processing the respective synthetic latent eyebrow style representation using the eyebrow style decoder; and constructing synthetic eyebrow strands for the synthetic eyebrows by processing at least part of the synthetic eyebrow style map using the strand decoder.

8. The system of claim 7, wherein the instructions are executable by the one or more processors to further configure the system to:

define a set of synthetic training data comprising:

training input comprising a synthetic eyebrow region of each synthetic human face image of the set of synthetic human face images; and ground truth output comprising, for each synthetic eyebrow region, the respective synthetic latent eyebrow style representation associated with the synthetic human face image of which the synthetic eyebrow region is a part.

9. The system of claim 8, wherein the instructions are executable by the one or more processors to further configure the system to:

train an eyebrow enrollment neural network using the set of synthetic training data, wherein the eyebrow enrollment neural network is configured to predict user-specific latent eyebrow style representation output based on user-specific eyebrow region image input.

10. A system for training one or more neural networks for eyebrow style enrollment, the system comprising:

one or more processors; and one or more computer-readable recording media that store instructions that are executable by the one or more processors to configure the system to:

access a set of synthetic training data comprising:

training input comprising a synthetic eyebrow region of each synthetic human face image of a set of synthetic human face images, wherein each synthetic human face image of the set of synthetic human face images comprises synthetic eyebrows obtained by:

determining a respective synthetic latent eyebrow style representation by performing sampling based on a set of latent eyebrow style representations;

constructing a synthetic eyebrow style map by processing the respective synthetic latent eyebrow style representation using an eyebrow style decoder, the eyebrow style decoder being configured to reconstruct eyebrow style map output from latent eyebrow style representation input; and constructing synthetic eyebrow strands for the synthetic eyebrows by processing at least part of the synthetic eyebrow style map using a strand decoder; and ground truth output comprising, for each synthetic eyebrow region, a respective synthetic latent eyebrow style representation associated with the synthetic human face image of which the synthetic eyebrow region is a part; and train an eyebrow enrollment neural network using the set of synthetic training data to configure the eyebrow enrollment neural network to predict user-specific latent eyebrow style representation output based on user-specific eyebrow region image input.

11. The system of claim 10, wherein the set of latent eyebrow style representations and the eyebrow style decoder are generated by training an eyebrow style neural network using a set of eyebrow style maps as training data.

12. The system of claim 11, wherein the set of eyebrow style maps is generated by processing a set of eyebrow strands of a respective eyebrow model of a set of eyebrow models using a strand encoder of a strand neural network, the strand encoder being configured to reduce 3D eyebrow strand input to latent eyebrow strand representation output.

13. The system of claim 12, wherein the strand neural network comprises the strand decoder, and wherein the strand neural network is trained using at least eyebrow strand data from the set of eyebrow models.

14. A system for facilitating user eyebrow enrollment, the system comprising:

one or more processors; and one or more computer-readable recording media that store instructions that are executable by the one or more processors to configure the system to:

access a user-specific eyebrow region image;

predict a user-specific latent eyebrow style representation by utilizing the user-specific eyebrow region image as input to an eyebrow enrollment neural network, wherein the eyebrow enrollment neural network is trained using a set of synthetic training data comprising:

training input comprising a synthetic eyebrow region of each synthetic human face image of a set of synthetic human face images, wherein each synthetic human face image of the set of synthetic human face images comprises synthetic eyebrows obtained by:

determining a respective synthetic latent eyebrow style representation by performing sampling based on a set of latent eyebrow style representations;

constructing a synthetic eyebrow style map by processing the respective synthetic latent eyebrow style representation using an eyebrow style decoder, the eyebrow style decoder being configured to reconstruct eyebrow style map output from latent eyebrow style representation input; and constructing synthetic eyebrow strands for the synthetic eyebrows by processing at least part of the synthetic eyebrow style map using a strand decoder; and ground truth output comprising, for each synthetic eyebrow region, a respective synthetic latent eyebrow style representation associated with the synthetic human face image of which the synthetic eyebrow region is a part;

reconstruct a user-specific eyebrow style map by processing the user-specific latent eyebrow style representation with an eyebrow style decoder; and reconstruct a set of eyebrow strands for a user-specific eyebrow model by processing at least part of the user-specific eyebrow style map with a strand decoder.

15. The system of claim 14, wherein the eyebrow style decoder is generated by training an eyebrow style neural network using a set of eyebrow style maps as training data.

16. The system of claim 14, wherein the instructions are executable by the one or more processors to further configure the system to apply the user-specific eyebrow model to an avatar of a user.

* * * * *